United States Patent
Volkovs et al.

(10) Patent No.: US 10,932,003 B2
(45) Date of Patent: Feb. 23, 2021

(54) METHOD AND SYSTEM FOR MAKING RECOMMENDATIONS FROM BINARY DATA USING NEIGHBOR-SCORE MATRIX AND LATENT FACTORS

(71) Applicant: THE TORONTO-DOMINION BANK, Toronto (CA)

(72) Inventors: Maksims Volkovs, Toronto (CA); Tomi Poutanen, Toronto (CA)

(73) Assignee: The Toronto-Dominion Bank, Toronto (CA)

(*) Notice: Subject to any disclaimer, the term of this patent is extended or adjusted under 35 U.S.C. 154(b) by 941 days.

(21) Appl. No.: 14/975,872

(22) Filed: Dec. 21, 2015

(65) Prior Publication Data

US 2016/0217374 A1 Jul. 28, 2016

Related U.S. Application Data

(60) Provisional application No. 62/108,067, filed on Jan. 27, 2015.

(51) Int. Cl.

| | |
|---|---|
| G06F 15/18 | (2006.01) |
| H04N 21/466 | (2011.01) |
| H04N 21/81 | (2011.01) |
| G06Q 30/06 | (2012.01) |
| G06Q 30/02 | (2012.01) |
| G06F 16/9535 | (2019.01) |

(52) U.S. Cl.
CPC ..... *H04N 21/4661* (2013.01); *G06F 16/9535* (2019.01); *G06Q 30/0251* (2013.01); *G06Q 30/0631* (2013.01); *H04N 21/8113* (2013.01)

(58) Field of Classification Search
None
See application file for complete search history.

(56) References Cited

U.S. PATENT DOCUMENTS

| | | |
|---|---|---|
| 6,947,922 B1 | 9/2005 | Glance |
| 8,037,080 B2 | 10/2011 | Koren |

(Continued)

OTHER PUBLICATIONS

Kurucz et al., Who Rated What: A Combination of SVD, Correlation and Frequent Sequence Mining, KDDCup (2007) at pp. 48-53 (Year: 2007).*

(Continued)

*Primary Examiner* — Jue Louie
(74) *Attorney, Agent, or Firm* — Fenwick & West LLP (57) ABSTRACT

One embodiment is a method executed by a computer system that applies collaborative filtering to provide a recommendation to a user. The method includes retrieving a binary matrix that includes rows and columns of binary data for preferences of users on items; applying a neighborhood-based approach to convert the binary matrix into a neighbor-score matrix; applying a factorization to approximate the neighbor-score matrix with a product of lower rank matrices; calculating a user factor and an item factor based on the factorization; calculating scores for user-item pairs by computing a dot product between the user factor and the item factor; sorting the scores of the user-item pairs to generate the recommendation to the user; and providing the recommendation to a general-purpose computer of the user.

15 Claims, 5 Drawing Sheets

(56) References Cited

U.S. PATENT DOCUMENTS

| | | | | |
|---|---|---|---|---|
| 2011/0153663 | A1* | 6/2011 | Koren | G06F 16/903 707/776 |
| 2013/0124449 | A1* | 5/2013 | Pinckney | G06N 5/048 706/52 |
| 2013/0204825 | A1* | 8/2013 | Su | G06N 5/04 706/46 |
| 2014/0129500 | A1* | 5/2014 | Nice | G06N 5/02 706/46 |

OTHER PUBLICATIONS

Sarwar et al., Application of Dimensionality Reduction in Recommender Systems—A Case Study, Technical Report, DTIC Document, 2000 at pp. 1-12 (Year: 2000).*

Luo et al., Incremental Collaborative Filtering Recommender Based on Regularized Matrix Factorization, Knowledge-Based Systems vol. 27 at pp. 271-280 (2012) (Year: 2012).*

Verstrepen, Collaborative Filtering with Binary Positive-only Data at pp. 1-18 (2015) (Year: 2015).*

Vozallis et al. "Applying SVD on Generalized Item-based Filtering", 2007, International Journal of Computer Science & Applications, vol. 3, Issue 3.*

Yehuda Koren, "Factor in the Neighbors: Scalable and Accurate Collaborative Filtering", 2010, ACM Transactions on Knowledge Discovery from Data, vol. 4, No. 1, Article 1.*

Ghazanfar et al. "The Advantage of Careful Imputation Sources in Sparse Data-Environment of Recommender Systems: Generating Improved SVD-based Recommendations", 2013, Informatica 37.*

Ren et al. "The Efficient Imputation Method for Neighborhood-based Collaborative Filtering", 2012, CIKM '12: Proceedings of the 21st ACM international conference on Information and knowledge management.*

Tang et al. "Refining User and Item Profiles based on Multidimensional Data for Top-N Item Recommendation", 2014, iiWAS '14: Proceedings of the 16th International Conference on Information Integration and Web-based Applications & Services.*

P.-A. Absil, C. G. Baker, and K. A. Gallivan. Trust-region methods on riemannian manifolds. Foundations of Computational Mathematics, 7(3), 2007.

G. Adomavicius and A. Tuzhilin. Toward the next generation of recommender systems: A survey of the state-of-the-art and possible extensions. IEEE Transactions on Knowledge and Data Engineering, 17(6), 2005.

F. Aiolli. Efficient top-n recommendation for very large scale binary rated datasets. In ACM Recommender Systems, 2013.

R. Baeza-Yates and B. Ribeiro-Neto. Information Retrieval. Addison-Wesley, 1999.

J. Bennett and S. Lanning. The Nefflix prize. KDD Cup and Workshop, Aug. 12, 2007.

D. Billsus and M. J. Pazzani. Learning collaborative information filters. In International Conference on Machine Learning, 1998.

M. Brand. Fast low-rank modifications of the think singular value decomposition. Linear algebra and its applications, 415(1), 2006.

C. J. C. Burges, T. Shaked, E. Renshaw, A. Lazier, M. Deeds, N. Hamilton, and G. Hullender. Learning to rank using gradient descent. In International Conference on Machine Learning, 2005.

Z. Cao, T. Qin, T.-Y. Liu, M.-F. Tsai, and H. Li. Learning to rank: From pairwise approach to listwise approach. In International Conference on Machine Learning, 2007.

Z. Gantner, S. Rendle, C. Freudenthaler, and L. Schmidt-Thieme. MyMediaLite: A free recommender system library. In ACM Recommender Systems, 2011.

N. Halko, P. G. Martinsson, and J. A. Tropp. Finding structure with randomness: Probabilistic algorithms for constructing approximate matrix decompositions. SIAM Review, 53(2), 2011.

J. Herlocker, J. A. Konstan, and J. Riedl. An empirical analysis of design choices in neighborhood-based collaborative filtering algorithms. Information Retrieval, 5(4), 2002.

Y. Hu, Y. Koren, and C. Volinsky. Collaborative filtering for implicit feedback datasets. In International Conference on Data Engineering, 2008.

Z. Huang, D. Zeng, and H. Chen. A comparison of collaborative-filtering recommendation algorithms for commerce. IEEE Intelligent Systems, 22(5), 2007.

K. Jarvelin and J. Kekalainen. IR evaluation methods for retrieving highly relevant documents. In ACM Special Interest Group on Information Retrieval, 2000.

T.-Y. Liu. Learning to rank for information retrieval. Springer, 2011.

Apache Software Foundation. Mahout stochastic singular value decomposition.

B. McFee, T. Bertin-Mahieux, D. P. Ellis, and G. R. Lanckriet. The Million Song Dataset Challenge. In International World Wide Web Conference, 2012.

H. Polat and W. Du. SVD-based collaborative filtering with privacy. In ACM Symposium on Applied Computing, 2005.

S. Rendle, C. Freudenthaler, Z. Gantner, and L. Schmidt-Thieme. BPR: Bayesian personalized ranking from implicit feedback. In Conference on Uncertainty in Artificial Intelligence, 2009.

R. Salakhutdinov and A. Mnih. Probabilistic matrix factorization. In Neural Information Processing Systems, 2008.

B. Sarwar, G. Karypis, J. Konstan, and J. Riedl. Application of dimensionality reduction in recommender system—a case study. Technical report, DTIC Document, 2000.

B. Sarwar, G. Karypis, J. Konstan, and J. Riedl. Item-based collaborative filtering recommendation algorithms. In International World Wide Web Conference, 2001.

B. Sarwar, G. Karypis, J. Konstan, and J. Riedl. Incremental singular value decomposition algorithms for highly scalable recommender systems. In International Conference on Information Systems, 2002.

R. Yuster and U. Zwick. Fast sparse matrix multiplication. ACM Transactions on Algorithms, 1(1), 2005.

* cited by examiner

---
Algorithm 1 SVD block-factorization
---
Input: R
Parameters: rank $r$, block size $N_b$, sparsity factor $\rho$
for $i = 1$ to $N/N_b$ do
   init block score matrix $\mathbf{S}_b = \text{sparse}(N_b, M)$
   for $u = (i-1)N_b + 1$ to $iN_b$ do
     calculate top-$\rho$ scores for $u$ using Eq. 1 or 2
     store top-$\rho$ scores in $\mathbf{S}_b(u,:)$
   end for
   if $i == 1$ then
     compute initial factorization:
        $[\mathbf{U}_r, \mathbf{S}_r, \mathbf{V}_r] = \text{SVD}(\mathbf{S}_b, r)$
   else
     update current factorization:
        $[\mathbf{U}_r, \mathbf{S}_r, \mathbf{V}_r] = \text{block-SVD}(\mathbf{U}_r, \mathbf{S}_r, \mathbf{V}_r, \mathbf{S}_b)$
   end if
end for
Output: $\mathbf{U}_r, \mathbf{S}_r, \mathbf{V}_r$

|  | 1K | 5K | 10K | 20K |
|---|---|---|---|---|
| 50,000 most popular songs | | | | |
| item-item (0.1498) | | | | |
| ii-SVD-1K | 0.1249 | 0.1466 | 0.1492 | 0.1493 |
| ii-SVD-5K | 0.1261 | 0.1472 | 0.1497 | 0.1494 |
| ii-SVD-full | 0.1258 | 0.1470 | 0.1495 | 0.1494 |
| 100,000 most popular songs | | | | |
| item-item (0.1628) | | | | |
| ii-SVD-1K | 0.1258 | 0.1539 | 0.1598 | 0.1622 |
| ii-SVD-5K | 0.1274 | 0.1550 | 0.1606 | 0.1621 |
| ii-SVD-full | 0.1272 | 0.1548 | 0.1604 | 0.1623 |

|  | 1K | 5K | 10K | 20K |
|---|---|---|---|---|
| 50,000 most popular songs | | | | |
| ii-SVD-1K | 0.9 | 1.9 | 4.6 | 17.9 |
| 100,000 most popular songs | | | | |
| ii-SVD-1K | 1.8 | 2.8 | 5.6 | 24.6 |

METHOD AND SYSTEM FOR MAKING RECOMMENDATIONS FROM BINARY DATA USING NEIGHBOR-SCORE MATRIX AND LATENT FACTORS

CROSS-REFERENCE TO RELATED APPLICATION

This application claims benefit under 35 U.S.C. § 119(e) of U.S. Provisional Application having Ser. No. 62/108,067 filed on 27 Jan. 2015, which is hereby incorporated by reference herein in its entirety.

FIELD OF THE INVENTION

The present invention relates to recommender systems, and more particularly, to the use of collaborative filtering in recommender systems.

BACKGROUND

Collaborative filtering is an approach utilized in recommender system to make predictions about preferences of an individual based on preference information of other individuals. This recommender system can function across various web services to deliver personalized recommendations to users, such as internet users of NETFLIX, AMAZON, YAHOO, GOOGLE, and others.

In collaborative filtering applications, latent factor approaches can be used to generate real-time recommendations for user preferences. Implicit feedback, where preferences are inferred indirectly by observing user behavior, can be collected at a lower cost and in much larger quantities than explicit feedback. Much of the available implicit data is binary where a user either conducts the action or no data is available. Latent factor approaches, however, perform poorly on binary data. Hence, a need exists for methods and systems that utilize collaborative filtering from binary data to determine user preferences and provide recommendations.

SUMMARY OF THE INVENTION

One example embodiment is a method executed by a computer system that applies collaborative filtering to provide a recommendation to a user. The method includes retrieving, by servers in the computer system and from a database, a binary matrix that includes rows and columns of binary data for preferences of users on items; applying, by the servers in the computer system, a neighborhood-based approach to convert the binary matrix into a neighbor-score matrix; applying, by the servers in the computer system, a factorization to approximate the neighbor-score matrix with a product of lower rank matrices; calculating, by the servers in the computer system, a user factor and an item factor based on the factorization; calculating, by the servers in the computer system, scores for user-item pairs by computing a dot product between the user factor and the item factor; sorting, by the servers in the computer system, the scores of the user-item pairs to generate the recommendation to the user; and providing, by the servers in the computer system, the recommendation to a general-purpose computer of the user.

Other example embodiments are discussed herein.

DETAILED DESCRIPTION

Examples embodiments relate to apparatus and methods that utilize collaborative filtering (CF) to determine user preferences for a user.

Consider an e-commerce example in which a recommender system executes collaborative filtering to make predictions about preferences of an individual based on preference information of other individuals. This recommender system can function across various services to deliver personalized recommendations to users, such as internet users of NETFLIX, AMAZON, YAHOO, GOOGLE, and others.

In general, CF approaches can be divided into two categories: latent factor approaches and neighbor-based approaches. Latent approaches (discussed in more detail herein) use the observed preferences to create a compact model of the data which is then used to predict the unobserved preferences. In contrast, neighbor-based approaches (discussed in more detail herein) estimate the item preferences for a target user using the similarities from neighboring users and/or items.

Preference data that is used to learn CF models can be partitioned into two types: explicit feedback and implicit feedback. Explicit feedback includes explicit preference actions from users. By way of example, data of this type comes in the form of ratings or a thumbs-up/down selection. While explicit feedback generally provides a high quality signal that accurately describes preferences of users. Collecting large amounts of this data can be time consuming.

Implicit feedback can come in many forms that include, but are not limited to, plays, purchases, browse histories, even mouse clicks, and mouse scrolls. Since no additional action is required from users beyond the normal use of the service, large amounts of implicit feedback can often be inexpensively collected in a short amount of time. This data, however, comes at the expense of increased signal noise.

Much of the available implicit data is binary where a user either conducts the action (purchase, browse, click etc.) on a given item or no data is available. Binary feedback makes the recommendation problem particularly challenging since it is difficult to gauge the degree of preference from such data.

In many collaborative filtering applications, latent approaches are the preferred model choice since they can efficiently provide real-time recommendations to users. Latent approaches, however, often perform poorly on implicit feedback in the form of binary data. Hence, a need exists for methods and systems that utilize latent CF from binary data.

One example embodiment includes methods and systems that utilize collaborative filtering with binary data to generate preferences for users. Neighborhood similarity information is used to guide the factorization and derive accurate latent representations. User preferences, in the form of binary data, are mapped to a non-binary space by applying similarity-based transformation to generate non-binary data. A factorization method, such as singular value decomposition (SVD), is applied to the non-binary data to generate accurate user and item latent factors.

The SVD approach learns the latent factors with block-SVD updates that are applied to top-N largest scores for each user. Example embodiments, however, are not limited to using an SVD approach since other factorization approaches as well can be applied once the binary data is mapped to non-binary space.

Figure 1:
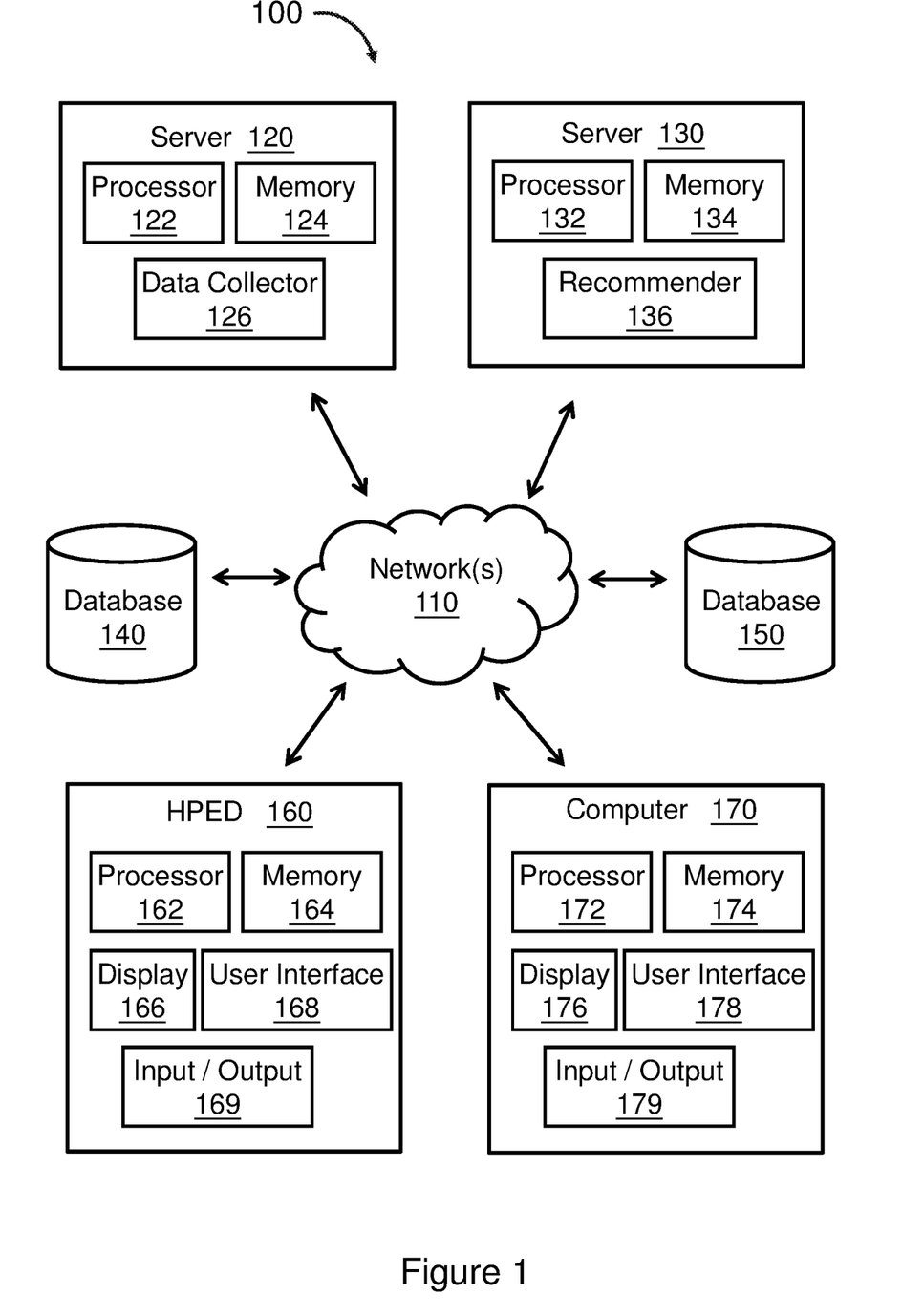
FIG. 1 shows a computer system in accordance with an example embodiment.

FIG. 1 shows a computer system 100 in accordance with an example embodiment. The computer system 100 includes a first server 120, a second server 130, a first database 140, a second database 150, a handheld portable electronic device (HPED), and a computer 170. One or more elements in the computer system 100 can communicate with each other through one or more networks 110.

The networks 110 can include one or more of the internet, an intranet, an extranet, a cellular network, a local area network (LAN), a home area network (HAN), metropolitan area network (MAN), a wide area network (WAN), a Bluetooth network, public and private networks, etc.

The first server 120 includes a processor 122 that communicates with a memory 124 and a data collector 126. By way of example, the processor 122 can be a microprocessor, central processing unit (CPU), or application-specific integrated circuit (ASIC) for controlling and/or receiving instructions or data from the memory 124 (such as random access memory (RAM), read only memory (ROM), and/or firmware).

The data collector 126 collects data such as user preferences from the network and stores the collected data in the first database 140. The second server 130 includes a processor 132 that communicates with a memory 134 and a recommender 136. The recommender 136 provides recommendations to users based on collaborative filtering techniques and saves data to the second database 150.

The HPED 160 includes a processor 162 that communicates with a memory 164, a display 166, a user interface 168 and an input/output (I/O) 169. In an example embodiment, the display 166 provides a user interface 168 that can record data related to user preferences such as plays, purchases, browse histories, even mouse clicks, and mouse scrolls and send the recorded data to the network through the input/output (I/O) 169.

The computer 170 includes a processor 172 that communicates with a memory 174, a display 176, a user interface 178 and an input/output (I/O) 179. In an example embodiment, the display 176 provides a user interface 178 that can record data related to user preferences and send the recorded data to the network through the input/output (I/O) 179.

Figure 2:
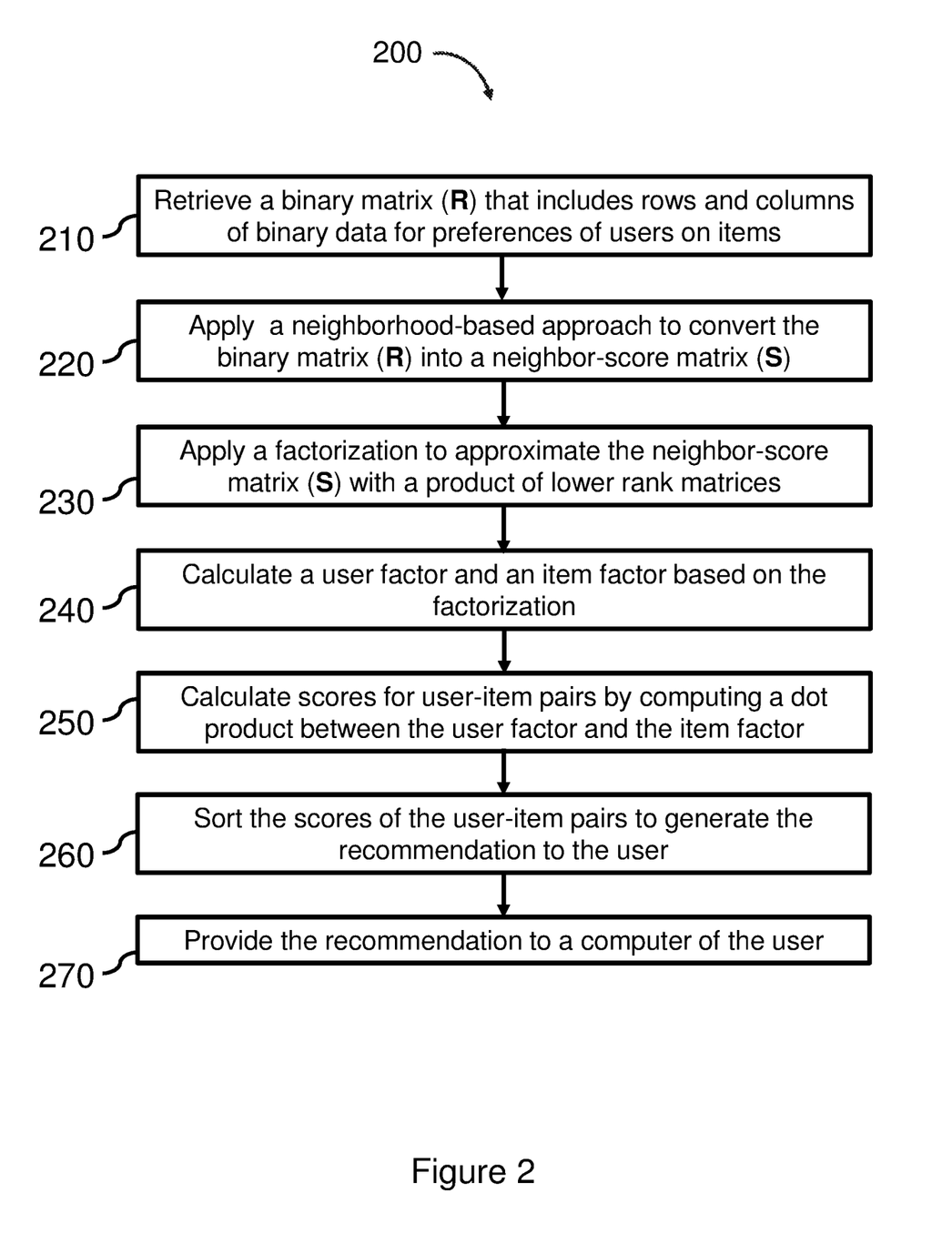
FIG. 2 shows a method executed by a computer system to provide a recommendation to a user in accordance with an example embodiment.

FIG. 2 is a method 200 executed by a computer system to provide a recommendation to a user.

According to block 210, the computer system retrieves a binary matrix (R) that includes rows and columns of binary data for preferences of users on items. By way of example, consider a collaborative filtering problem that has a set of N users $U=\{u_1, \ldots, u_N\}$ and a set of M items $V=\{v_1, \ldots, v_M\}$. The users' binary feedback for the items can be represented by an N×M matrix R where $R(u_n,v_m)=1$ if user unexpressed preference (played, purchased, clicked etc.) for item $v_m$ and $R(u_n,v_m)=0$ otherwise. We use $U(v_m)$ to denote the set of all users that preferred $v_m$ and $V(u_n)$ to denote the set of items that $u_n$ has expressed preference for. We use a vector notation: $R(u_n,:)$ denotes the n'th row of R (1×M vector), and $R(:,v_m)$ denotes the m'th column (N×1 vector). Unlike another CF where the goal is to accurately predict ratings for every user-item pair, an aim of an example embodiment is to produce in the binary domain a top-T ranking of the items that the user is most likely to prefer next.

Latent approaches use the observed preferences to create a compact model of the data that is then used to predict the unobserved preferences. For example, latent models derive compact latent factors for both users and items and then use these factors to predict preference. Once the factors are estimated, recommendations can be generated by computing simple dot products between latent factors which allows these models to be applied in real-time.

By way of example, two latent approaches that can be used with binary data include Weighted Regularized Matrix Factorization (WRMF) and Bayesian Personalized Ranking Matrix Factorization (BPR-MF). Both WRMF and BPR-MF are examples of factorization. WRMF is a regression method that learns user-item factors by minimizing the weighted reconstruction error:

$$\sum_{n=1}^{N}\sum_{m=1}^{M} c_{nm}(1 - U_r(u_n,:)V_r(v_m,:)^T)^2 + \lambda\|U_r\|^2 + \lambda\|V_r\|^2$$

where $U_r$ is an N×r user factor matrix, $V_r$ is an M×r item factor matrix, and $c_{nm}$ is a weight that is set separately for every user-item pair. For binary data $c_{nm}$ is set to:

$$c_{nm}=1 +\alpha R(u_n,v_m)$$

This formulation adds an extra α weight to every pair with $R(u_n,v_m)=1$ forcing optimization to concentrate on those pairs. WRMF can use alternating least squares to optimize this model with an overall complexity of $O(Nr^2+(N+M)r^3)$ where N is the total number of non-zero entries in R.

BPR-MF is a ranking approach and optimizes pairwise objectives that attempt to place pairs with observed preference above the unobserved ones:

$$\sum_{(u_n,v_m,v_l)} \log(1 + \exp(-U_r(u_n,:)(V_r(v_m,:) - V_r(v_l,:))^T)) + \lambda\|U_r\|^2 + \lambda\|V_r\|^2$$

where triplets $(u_n,v_m,v_l)$ are sampled with a condition that $R(u_n,v_m)=1$ and $R(u_n,v_l)=0$. Similarly to WRMF, this implies an assumption that every item $v_l$ with $R(u_n,v_l)=0$ is not relevant and should be ranked below the relevant items $v_m$ with $R(u_n,v_m)=1$. Moreover, each relevant (irrelevant) item is assumed to be equally relevant (irrelevant). These assumptions often may not hold in real-life scenarios where noisy implicit signals tend to produce incorrect/outlier preferences that should be discounted.

It may not be optimal to treat every observed (unobserved) items as equally relevant (irrelevant) in the binary CF setting. Consider an example in which a person purchases the following movies: "The Lord of the Rings" trilogy, both "Hobbit" releases, and "The Devil Wears Prada" (the latter being a present for a friend). If we could request explicit preference data from this user we would immediately know that he or she does not enjoy movies like "The Devil Wears Prada" since this movie was purchased for a friend and not the user. However, given that we only have access to purchase history, objectives in WRMF and BPR-MF would treat all purchases as equally relevant. During optimization for this user, both methods would aim to derive latent representations that equally rank each of the movies at the top. Such a ranking would not be optimal since one of the movies (i.e., "The Devil Wears Prada") was not a preference for the user, but bought as a gift. This situation creates a problem since the data does not reveal that one of the movies was bought for a gift.

One way of dealing with this problem is through model regularization, and both methods apply strict regularization to penalize user and item factors. However, as the number of outliers increases the problem becomes more severe and might no longer be fixable by heavy regularization.

Neighborhood-based CF approaches address this problem by estimating item scores for a target user using a similarity from neighboring users and/or items. Formally, given an item v and target user u, the user-user approach estimates the score for v by comparing u with other users that expressed preference for v:

$$\text{user-user: } S(u, v) = \sum_{u' \in u(v)} R(u, :) R(u', :)^T \quad \text{EQ. 1}$$

The idea behind this approach is based on the assumption that if users similar to u prefer v then S(u,v) should be high and v should be recommended to u. In the item-item approach, v is compared to all items that u has expressed preference for:

$$\text{item-item: } S(u, v) = \sum_{v' \in v(u)} R(:, v)^T R(:, v') \quad \text{EQ. 2}$$

This method produces higher scores for items that are similar to items for which u has expressed a preference.

After estimating scores for every item either via the user-user or the item-item method, the resulting score vector S(u,:) is sorted and top-T items are presented to u. In practice it is often found that the accuracy of each method can be improved if a dot product is replaced with a more complex metric, such as a cosine similarity. For example, this replacement can be done for the binary domain, by applying $L^2$ normalizations:

$$\text{row-norm: } R(u, :) = \frac{R(u, :)}{\sqrt{\sum_{n=1}^{N} R(u, v_n)^2}}$$

$$\text{col-norm: } R(:, v) = \frac{R(:, v)}{\sqrt{\sum_{m=1}^{M} R(u_m, v)^2}}$$

For many datasets, applying both normalizations before computing similarities produces gains of up to 30%. Further, the order in which these normalizations are applied can be validated separately for each dataset. When only row-norm (col-norm) normalization is applied, user-user (item-item) scores become the sums of cosine similarities.

For the aforementioned movie example, applying neighbor approach such as item-item would generate a lower score for the unwanted movie (i.e., "The Devil Wears Prada") since this movie is not similar to any other purchase by this user. The neighbor approach thus provides an effective way to resolve ties in the binary preference matrix, and the neighbor score matrix S reflects user preferences more accurately than the raw binary matrix R.

One example embodiment utilizes a neighbor approach and factorizes the neighbor score matrix S instead of the original binary matrix R. Using S instead of R effectively resolves ties in the binary preference data, and applying low-rank factorization produces models that support efficient inference and reduces the noise that is often present when similarities are computed on highly sparse data.

According to block 220, the computer system applies a neighborhood-based approach to convert the binary matrix (R) into a neighbor-score matrix (S). By way of example, in a binary setting, the neighbor-score matrix is generated via the user-user (EQ. 1) or item-item (EQ. 2) methods.

According to block 230, the computer system applies a factorization to approximate the neighbor-score matrix (S) with a product of lower rank matrices. By way of example, Singular Value Decomposition (SVD) is used to approximate the neighbor-score matrix (S) with a product of three matrices by:

$$S \approx U_r \Sigma_r V_r^T$$

where r is an SVD rank, $U_r$ is an N×r matrix, $\Sigma_r$ is an r×r diagonal matrix, $V_r$ is an M×r matrix, and $V_r^T$ is a transpose of matrix $V_r$.

According to block 240, the computer system calculates a user factor and an item factor based on the factorization. By way of example, once the SVD factorization is completed $\Sigma_r$ is absorbed into $U_r$. As such, $U_r$ denotes the product of two matrices ($U_r\Sigma_r$) from the SVD decomposition in the following paragraphs. The user factor is a vector represented by $U_r(u,:)$, and the item factor is a vector represented by $V_r(v,:)$.

According to block 250, the computer system calculates scores for user-item pairs by computing a dot product between the user factor and the item factor. The scores for every user-item pair are calculated by computing dot product between the corresponding user and item factors:

$$S(u, v) \approx U_r(u,:) V_r(v,:)^T$$

According to block 260, the computer system sorts the scores of the user-item pairs to generate the recommendation to the user. By way of example, the scores of the user-item pairs are arranged from the highest to the lowest and the items with higher scores are recommended to the relevant user.

According to block 270, the computer system provides the recommendation to computer of the user. By way of example, the recommendation is transmitted to the user, displayed to the user, stored for the user, processed for the user, or used to make further recommendations to or on behalf of the user.

By way of example, one embodiment performs factorization with SVD. Example embodiments, however, are not limited to using SVD as most other factorization methods can be used as well. By replacing the original binary matrix R with S example embodiments can apply various latent approaches. Some examples of the objective functions that can be used to learn U and V are provided below.

Consider an example of a regression objective, such as the squared error and weighted squared error (used in WRMF):

$$sq.\ error:\ \sum_{n=1}^{N}\sum_{m=1}^{M}(S(u_n,v_m)-U_r(u_n,:)V_r(v_m,:)^T)^2$$

$$wrmf:\ \sum_{n=1}^{N}\sum_{m=1}^{M}c_{nm}(1-U_r(u_n,:)V_r(v_m,:)^T)^2$$

$$c_{nm}=1+\alpha S(u_n,v_m)$$

Unlike another CF where effort is concentrated on rating prediction, for binary preference CF an example goal is to optimize the ranking accuracy. Ranking-based objectives might thus be suited for this problem. Since S provides rich ordering information over the items, an example embodiment applies objectives from learning-to-rank to this domain. Examples of two such objectives include RankNet (also used in BPR-MF) and ListNet:

$$ranknet\ \sum_{(u_n,v_m,v_l)}\log\left(1+e^{-U_r(u_n,:)(V_r(v_m,:)-V_r(v_l,:))^T}\right)$$

for $S(u_n,v_m) > S(u_n,v_l)$ $$listnet\ -\sum_{n=1}^{N}\sum_{m=1}^{M}\frac{\phi(S(u_n,v_m))}{\sum_{l=1}^{M}\phi(S(u_n,v_l))}\log\left(\frac{\phi(U_r(u_n,:)V_r(v_l,:)^T)}{\sum_{l=1}^{M}\phi(U_r(u_n,:)V_r(v_l,:)^T)}\right)$$

SVD provides an effective way to derive latent representations. This method, however, may require computing and storing the full score matrix S which may not practical or desirable for large-scale applications. Example embodiments include methods and apparatus to reduce this computation and/or storage, such as using a block update and sparse similarity discussed herein.

The naive SVD model has runtime complexity of $O(NM\log(r)+(N+M)r^2)$ using the stochastic SVD algorithm and requires $O(NM)$ space. Consider an example of block update which utilizes incremental SVD where factorization is built in stages to enable processing of large amounts of data without explicitly storing the data. For instance, a method takes as input "current" factorization $U\Sigma V^T \approx X$ and matrix A, and produces updated SVD factorization $U_{new}\Sigma_{new}V_{new}^T \approx [X,A]$. Note that in this formulation $V^T$ gets expanded to have a same or similar number of columns as $[X,A]$ whereas U and $\Sigma$ get updated but do not change in size. Analogous algorithm can be used to update U: using the fact that $V\Sigma U^T = X^T$ generates the following:

$$V_{new}\Sigma_{new}U_{new}^T \approx [X^T,A^T].$$

Consider an example that incrementally factorizes users to achieve considerable savings in space requirements. Users are partitioned into blocks of size $N_b$ and for each block iteratively (1) calculate $N_b \times M$ neighbor score matrix and (2) update SVD factorization to include latent factors for users in the block. The runtime complexity of this block-factorization method is:

$$O(NM\log(r)+(N+M)r^2)\ for\ r<\sqrt{\min(N,M)}.$$

The space for this method reduces to $O(N_bM+(N+M)r))$ where $O(N_bM)$ is the block size, and $O((N+M)r)$ is the space required to store the final $U_r$ and $V_r$ factors. This represents a large reduction in space from the original $O(NM)$ and makes the method practical for CF applications. Moreover, block update provides an effective way to update the SVD model when new users and/or items are added to the system.

Further, users can be incrementally processed but the same algorithm can be straightforwardly modified to incrementally process items instead. Thus depending on whether N>>M or N<<M example embodiments include user oriented approach and/or item oriented approach.

As noted, incremental block updates can significantly reduce the space complexity to $O(N_bM)$ where $N_b$ is the block size. For large scale applications, however, the number of items can reach millions or hundreds of millions so even $O(N_bM)$ can become too large. To deal with this problem, one example embodiment uses sparse similarity and selectively uses a small subset of similarity scores for each user. This is achieved by storing the largest $\rho$ scores for each user and zeroing out the rest of the scores.

Sparse similarity uses the largest scores to maximize the accuracy at the top of the ranking. Items with large scores are thus particularly relevant since they would appear at the top for each user. Furthermore, SVD produces factorizations that are closest to the target matrix in Frobenius norm (i.e., root mean squared error). By zeroing out low scores, SVD concentrates on ordering items at the top correctly and puts less emphasis on relative orderings at the bottom.

This sparse similarity approach allows an example embodiment to further reduce the space requirement for each block to $O(N_b\rho)$ since sparse format can now be used and zeros do not need to be explicitly stored. Sparse representation also allows for efficient matrix multiplication and the complete block-factorization can now be computed in $O(T_{mult}r+(N+M)r^2)$ where $T_{mult}$ is the cost of matrix-vector multiplication with sparse score matrix. Given that the entire score matrix now has at most $N\rho$ non-zero entries, the matrix-vector product can be computed in time proportional to $N\rho$, and for $\rho<<M$ we get that $T_{mult}<<NM$. Note that $O(T_{mult}r+(N+M)r^2)$ is an order of magnitude more efficient than WRMF with complexity $O(r^2N+(N+M)r^3)$.

Figure 3:
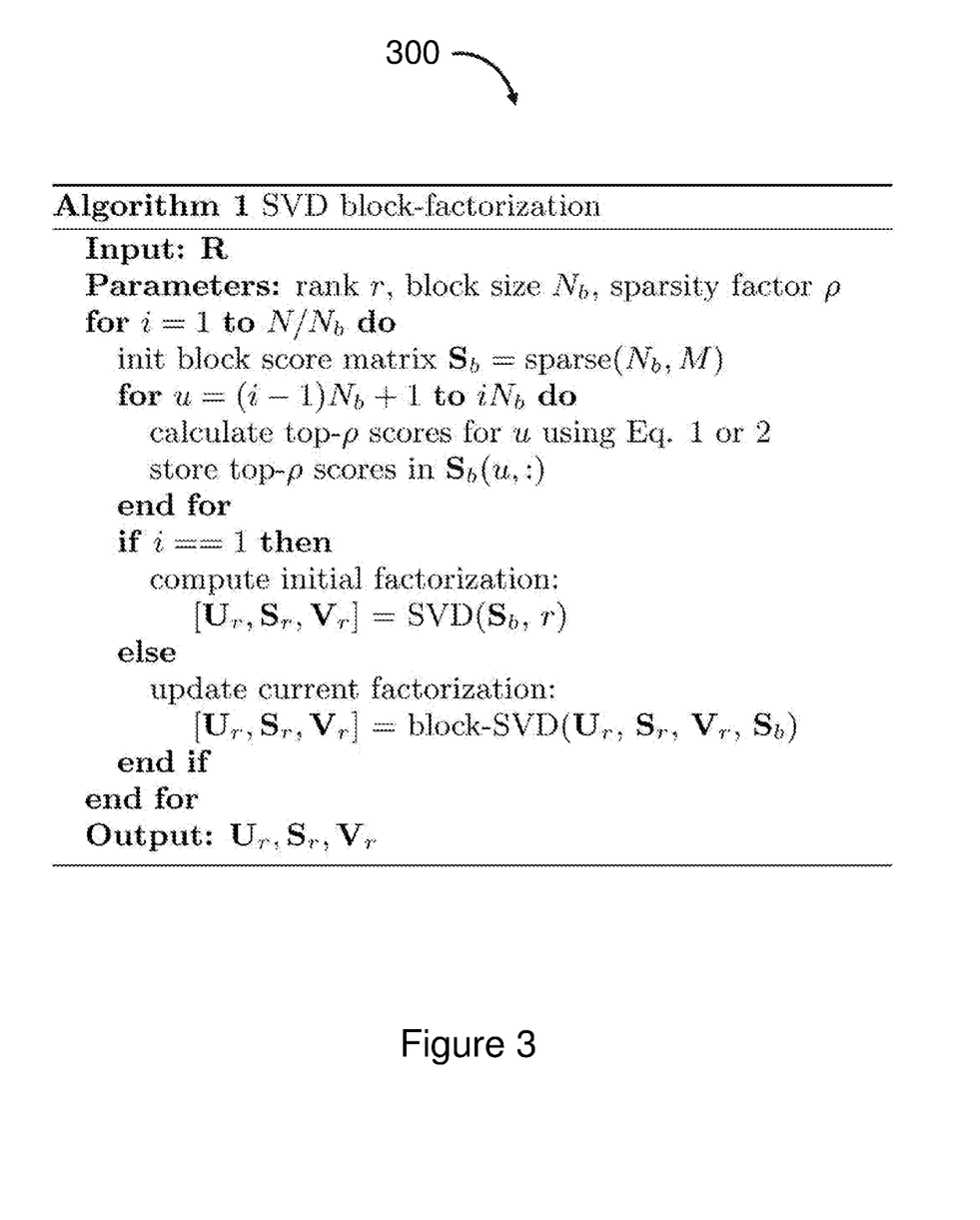
FIG. 3 shows an example algorithm with block update and sparse similarity in accordance with an example embodiment.

FIG. 3 shows an example algorithm 300 with block update and sparse similarity.

One goal of CF is to efficiently provide accurate recommendations to new users that were not available during model optimization. This problem is referred to as strong generalization and is addressed in a recommender system of an example embodiment.

Neighbor-based models can generally be applied to new users without difficulties since similarities can be straightforwardly re-calculated to incorporate new data. Latent approaches on the other hand, often use complicated non-convex objectives and thus require expensive gradient updates to be conducted for every new user. An example embodiment addresses the strong generalization problem in the SVD model and derives an update equation to efficiently produce latent factors for new users.

One way of dealing with new users/items is to run a full block SVD update to generate new latent factors and also update the rest of the model. This update can be run after one or more new users/items have been added. For example, consider a method to approximate latent factors by utilizing the properties of SVD factorization. First, note that the score vector for every user u is approximated by the user item factor product:

$$S(u,:) \approx U_r(u,:)V_r^T$$

where $\Sigma_r$ is absorbed into $U_r$. From this it follows that:

$$U_r(u,:) \approx S(u,:)V_r^{T(-1)}$$

but since $V_r$ is approximately orthogonal we get that $V_r^{-1} \approx V_r^T$ and:

$$U_r(u,:) \approx S(u,:)V_r$$

A similar approach can be used to derive an equation for item factors: $V_r(v,:) \, S(:,v)^T U_r$. The equation above provides a convenient and effective way to approximate and update user factors for a new user u by (1) calculating top-$\rho$ neighbor scores $S(u,:)$ and (2) multiplying $S(u,:)$ with $V_r$ to get $U_r(u,:)$.

In production-level systems, the equation above can be used to quickly generate recommendations for each new user. A full block updates is executed once enough new users/items have been added. Note that unlike gradient-based models, block update does not require any iterative optimization or parameter tuning (initialization, learning rate, weight penalty etc.) and can efficiently update the entire model.

As such, an example embodiment utilizes an SVD-based model that has low complexity and storage requirement block update that can efficiently update the entire model. Further, in an example embodiment, two parameters are tuned: rank r and sparsity factor $\rho$ (block size $N_b$ is typically selected to maximize RAM usage). The SVD-based model can scale to large CF problems with distributed implementations (e.g., Mahout's stochastic SVD). Furthermore, new users/items can be quickly incorporated into existing models with one matrix multiplication.

Consider an example embodiment that is applied to a large publicly available dataset from Kaggle's Million Song Dataset (MSD) challenge. The MSD dataset consists of listening histories for 1.2 million (M) users and 380 thousand (K) songs. The goal of the challenge was to use these listening histories to recommend 500 songs for a subset of 110K test users. The data for the 110K test users was partitioned into training and test sets, and only training portion was made available to the challenge participants (in addition to full listening history for the other 1.1M users). The test set was further split into two subsets with 10K and 100K users respectively. The results on the smaller 10K subset were made visible throughout the challenge ("public leaderboard"), while results on the 100K subset were only revealed at the end of the challenge ("private leaderboard"). All submissions had to provide rankings of top-500 songs for each of the 110K test users and were evaluated using MAP@500. At the end of the challenge organizers released all the challenge data (including test data) into public domain.

Note that the MSD dataset has more than 20 times more items than the Netflix dataset, and is over 100 times more sparse. This makes the problem challenging since many users/items have little data to build accurate representations.

Figure 4:
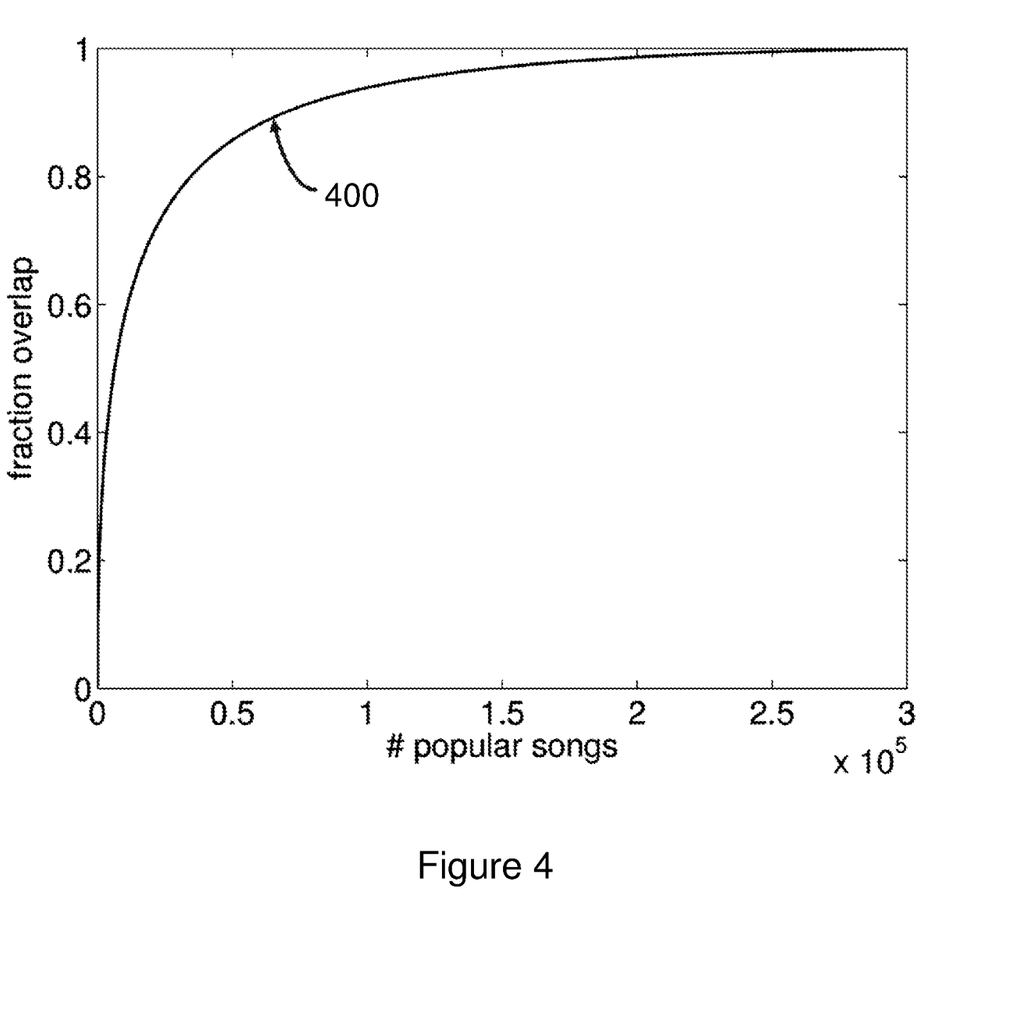
FIG. 4 shows fraction overlap between training data for 110K target users and most popular songs sorted in the order of popularity in accordance with an example embodiment.

The sparsity problem is further illustrated in FIG. 4 that shows fraction overlap as denoted at 400 between the training data for the 110K target users and most popular songs sorted in the order of popularity. The x-axis is a number of popular songs, and the y-axis is the fraction overlap. This figure shows that more that 93% of all the training data is contained within the first 100K most popular songs, leaving less than 7% of data for the remaining 280K songs.

The latent approaches were found to perform poorly in this challenge. The best latent submission was reported to get MAP@500 of 0.1095, while the winning solution achieved 0.1791 using a blend of user-user and item-item approaches. These results indicate that neighbor methods produce over 60% relative improvement in accuracy on this data compared to latent approaches. By contrast, and as discussed further below, an example embodiment eliminates this performance gap achieving results that are comparable to neighbor methods.

In the MSD experiments, an example embodiment followed the same set-up that was used during the competition and tune models on the 10K public leaderboard set, then evaluate on the 100K private leaderboard set. The algorithm 300 in FIG. 3 was implemented in Matlab and used a stochastic SVD library and a block SVD library. For block SVD, the example embodiment modified the provided code by replacing the call to Matlab's SVD's routine with a faster stochastic SVD call. MyMediaLite library was used to run the WRMF and BPR-MF baselines.

Figure 5:
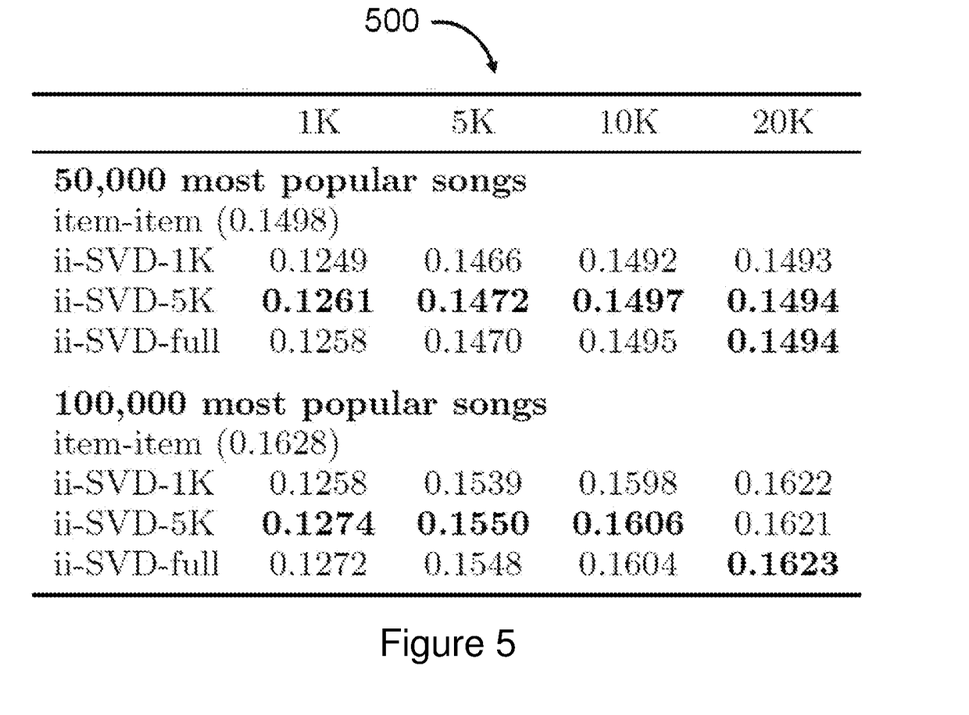
FIG. 5 shows MAP@500 private leader board results in accordance with an example embodiment.

MAP@500 private leader board results are shown in table 500 of FIG. 5. For this dataset, a larger rank generally improved performance, and results are shown for four different rank sizes: 1K, 5K, 10K and 20K. To reduce experiment complexity, the item space is down-sampled to include most popular songs and experimented with top 50,000 and 100,000 songs. The data shows that 100,000 (50,000) most popular songs contain over 93% (80%) of all training data. Consequently, selecting only the popular songs allows an example embodiment to reduce the item space by a factor of four while keeping most of the training data.

The results show that the SVD model with large enough rank is able to match the performance of the corresponding item-item approach. The results for the best SVD model place it in top-3 (out of 150 teams) on Kaggle's leaderboard with a score of 0.1623. This is by far the highest score for latent approach in this competition. Many of the top ten teams used combinations of user-user and/or item-item approaches, and the best latent approach was reported to only get 0.1095. Further, the SVD-1 K performs comparably to SVD-full on both 50,000 and 100,000 songs suggesting that scores for only 1,000 songs per user are required to produce accurate factorizations.

MSD is one the largest publically available datasets, and an example embodiment used it to benchmark the runtimes for the SVD approach and the best existing latent approach WRMF. To ensure accurate comparison each experiment was conducted on the same server with 32 Intel Xeon E5-2690 2.90 GHz cores and 64 GB of RAM. Runtimes in hours for the SVD model are shown in table 600 of FIG. 6.

Figure 6:
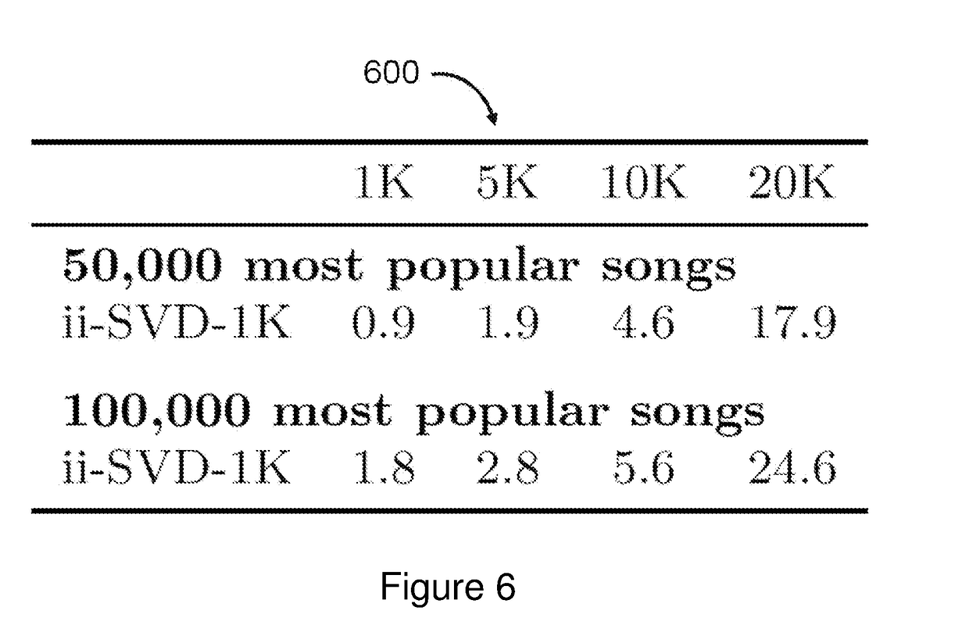
FIG. 6 shows runtimes in hours for a SVD model in accordance with an example embodiment.

Table 600 shows that full factorization with 100,000 songs can be completed in under 3 hours with rank 5,000 and under 6 hours with rank 10,000. For comparison, WRMF took over 10 hours to complete with rank 250, and using complexity bounds for rank 10,000 it would take over a month. These results demonstrate that an example embodiment is considerably more efficient than the existing state-of-the-art and scales well to large datasets.

FIGS. 4-6 show data supporting one or more example embodiments that determine user preferences from binary data. In one example embodiment, binary data in a matrix is transformed into a score matrix by applying neighborhood similarity rescaling. The score matrix is then factorized to produce accurate user and item representations. A factorization technique (such as SVD) generates an accurate representations using a small subset of the highest scores for each user.

FIG. 1 shows an example computer system in which the computer and/or one or more electronic devices in the computer system execute one or more example embodiments (such as one or more blocks discussed in FIG. 2). One or more processors or processing units (such as a central processing unit, CPU, microprocessor, application-specific integrated circuit (ASIC), etc.) communicates with memory and/or other hardware to execute tasks that implement one or more example embodiments discussed herein. By way of example, the memory stores applications, data, programs, algorithms (including software to implement or assist in implementing example embodiments) and other data. As another example, hardware in a computer or electronics are specifically adapted or specialized to execute or assist in executing one or more example embodiments (such as providing an ASIC designed to execute example embodiments).

In one example embodiment, the methods executed by the computer system reduce storage requirement in the respective storage devices of the computer system and speeds up runtime.

In some example embodiments, the methods illustrated herein and data and instructions associated therewith are stored in respective storage devices, which are implemented as computer-readable and/or machine-readable storage media, physical or tangible media, and/or non-transitory storage media. These storage media include different forms of memory including semiconductor memory devices such as DRAM, or SRAM, Erasable and Programmable Read-Only Memories (EPROMs), Electrically Erasable and Programmable Read-Only Memories (EEPROMs) and flash memories; magnetic disks such as fixed, floppy and removable disks; other magnetic media including tape; optical media such as Compact Disks (CDs) or Digital Versatile Disks (DVDs). Note that the instructions of the software discussed above can be provided on computer-readable or machine-readable storage medium, or alternatively, can be provided on multiple computer-readable or machine-readable storage media distributed in a large system having possibly plural nodes. Such computer-readable or machine-readable medium or media is (are) considered to be part of an article (or article of manufacture). An article or article of manufacture can refer to a manufactured single component or multiple components.

Method blocks discussed herein can be automated and executed by a computer, computer system, user agent, and/or electronic device. The term "automated" means controlled operation of an apparatus, system, and/or process using computers and/or mechanical/electrical devices without the necessity of human intervention, observation, effort, and/or decision.

As used herein, "binary data" is data whose unit can take on only two possible states.

As used herein, "binary domain" is a domain where all data instantiations are binary.

As used herein, a "binary matrix" is a matrix in which each entry is either 0 or 1.

As used herein, "collaborative filtering" is a method or system that predicts preferences of a user for an item based on preferences of other users for the item.

As used herein, "explicit feedback" is preference feedback provided explicitly by the user.

As used herein, "implicit feedback" is preference feedback inferred implicitly from user actions.

As used herein, a "latent factor for a user" and a "user factor" are interchangeable.

As used herein, a "latent factor for an item" and an "item factor" are interchangeable.

As used herein, a "latent model" is a model where users and items are represented by latent factors.

As used herein, a "recommender" or "recommender system" is a system that predicts a preference that a user would give an item.

As used herein, a "score matrix" is a matrix of scores for some or all user-item pairs where each score represents a degree of preference for the corresponding user-item pair.

The apparatus and methods in accordance with example embodiments are provided as examples, and examples from one apparatus or method should not be construed to limit examples from another apparatus or method. Further, methods discussed within different figures can be added to or exchanged with methods in other figures. Further yet, specific numerical data values (such as specific quantities, numbers, categories, etc.) or other specific information should be interpreted as illustrative for discussing example embodiments. Such specific information is not provided to limit example embodiments.

What is claimed is:

1. A method executed by a computer system that applies collaborative filtering to provide a recommendation to a user, the method comprising:

retrieving, by servers in the computer system and from a database, a binary matrix (R) that includes rows and columns of binary data for preferences of users on items;

applying, by the servers in the computer system, a neighborhood-based approach to convert the binary matrix (R) into a neighbor-score matrix (S) by computing neighbor scores for the users and the items, a neighbor score for a particular user and a particular item in the neighbor-score matrix (S) determined by performing a dot product between preferences of the particular user and preferences of other users who have expressed preferences for the particular item in the binary matrix (R), or by performing a dot product between preferences for the particular item and preferences for other items that the particular user has expressed preferences for in the binary matrix (R);

applying, by the servers in the computer system, a singular value decomposition (SVD) to approximate the neighbor-score matrix (S) with a product of three matrices via the SVD;

calculating, by the servers in the computer system, a user factor for each of the users and an item factor for each of the items based on the SVD;

calculating, by the servers in the computer system, scores for user-item pairs, a score for a user-item pair generated by computing a dot product between the user factor and the item factor for the user-item pair;

sorting, by the servers in the computer system, the scores of the user item pairs to generate the recommendation to the user;

providing, by the servers in the computer system, the recommendation to a general-purpose computer of the user;

approximating, by the servers in the computer system, the item factor for a new-added item v by:

$$V_r(v,:) \approx S(:,v)^T U_r$$

where $S(:,v)$ is a neighbor-score vector for the new-added item v indicating neighbor scores for the users and the new-added item v, $U_r$ are the user factors for the users, and $V_r(v,:)$ is the item factor for the new-added item v; and updating the SVD when a number of the new-added items reaches a predetermined threshold.

2. The method of claim 1, further comprising:

applying, by the servers in the computer system, the SVD with the product of the three matrices to approximate the neighbor-score matrix (S) by:

$$S \approx U_r \Sigma_r V_r^T$$

where r is an SVD rank, $U_r$ is an N×r matrix, $\Sigma_r$ is an r×r diagonal matrix, is an M×r matrix, and $V_r^T$ is a transpose of matrix $V_r$.

3. The method of claim 1, further comprising:
computing, by the servers in the computer system, the dot product between the user factor and the item factor by:

$$S(u,v) \approx U_r(u,:)V_r(v,:)^T$$

where $S(u,v)$ is a predicted preference for the user (u) for an item (v), $U_r(u,:)$ is the user factor, and $V_r(v,:)^T$ is the item factor.

4. The method of claim 1, further comprising:
partitioning, by the servers in the computer system, the users into blocks of size $N_b$ smaller than a number of the users and for each block iteratively calculating an $N_b \times M$ neighbor score matrix and updating SVD factorization to include user factors for the users in the block, wherein M indicates a number of the items.

5. The method of claim 1, further comprising:
reducing, by the servers in the computer system, space of the SVD from O(N M) space where N indicates a number of the users and M indicates a number of the items to $O(N_b \rho)$ by storing only top $\rho$ scores of the users with being the users in blocks of size $N_b$ smaller than the number of users N and $\rho$ being an integer less than M.

6. The method of claim 1, further comprising:
approximating, by the servers in the computer system, the user factor for a new-added user u by:

$$U_r(u,:) \approx S(u,:)V_r$$

where $S(u,:)$ is a neighbor-score vector for the new-added user u indicating neighbor scores for the new-added user u and the items, $V_r$ are the item factors for the items, and $U_r(u,:)$ is the user factor for the new-added user u; and
updating the SVD factorization when a number of the new-added users reaches a predetermined threshold.

7. A computer system, comprising:
servers that collect user preferences that are derived from implicit feedback from users for items while interfacing with electronic devices;
a database that communicates with the servers and stores the user preferences as binary data; and
a server including a memory, wherein the server communicates with the database, retrieves the binary data of the user preferences, and executes collaborative filtering on the binary data to provide recommendations for products to the users by:
  applying a neighbor-based similarity transformation to map the binary data of the user preferences to non-binary data of the user preferences,
  generating from the non-binary data a neighbor-score matrix (S) by computing neighbor scores for the users and the items, a neighbor score for a particular user and a particular item in the neighbor-score matrix (S) determined by performing a dot product between preferences of the particular user and preferences of other users who have expressed preferences for the particular item in the binary matrix (R), or by performing a dot product between preferences for the particular item and preferences for other items that the particular user has expressed preferences for in the binary matrix (R),
  applying a singular value decomposition (SVD) model to the non-binary data of the neighbor-score matrix (S) to determine latent factors for the users and the items for which the users provided implicit feedback,
  calculating scores for user-item pairs by computing a dot product between the latent factors for the users and the items to generate the recommendations for the products to the users;
  approximate a latent factor for a new-added item v by:

$$V_r(v,:) \approx S(:,v)^T U_r$$

where $S(:,v)$ is a neighbor-score vector for the new-added item v indicating neighbor scores for the users and the new-added item v, $U_r$ are the latent vectors for the users, and $V_r(v,:)$ is the latent factor for the new-added item v; and
update the SVD model when a number of the new-added items reaches a predetermined threshold.

8. The computer system of claim 7, wherein the server that communicates with the database further computes the dot product between the latent factors for the users and the items by:

$$S(u,v) \approx U_r(u,:)V_r(v,:)^T$$

where $S(u,v)$ is a predicted preference for the user (u) for an item (v), $U_r(u,:)$ is the user factor, and $V_r(v,:)^T$ is the item factor.

9. The computer system of claim 7, wherein the server that communicates with the database further divides the users into groups of size $N_b$ smaller than a number of the users and for each group iteratively calculates an $N_b \times M$ neighbor score matrix and updates SVD factorization to include latent factors for the users in the group, wherein M indicates a number of the items.

10. The computer system of claim 7, wherein the server that communicates with the database further approximates a latent factor for a new-added user u by:

$$U_r(u,:) \approx S(u,:)V_r$$

where $S(u,:)$ is a neighbor-score vector for the new-added user u indicating neighbor scores for the new-added user u and the items, $V_r$ are the latent factors for the items, and $U_r(u,:)$ is the latent factor for the new-added user u; and
updating the SVD model when a number of the new-added users reaches a predetermined threshold.

11. A method executed by a computer system that applies collaborative filtering to provide a recommendation to a user, the method comprising:
retrieving, by servers in the computer system and from a database, a binary matrix (R) that includes rows and columns of binary data for preferences of users on items;
applying, by the servers in the computer system, a neighborhood similarity rescaling to convert the binary matrix (R) into a neighbor-score matrix (S) by computing neighbor scores for the users and the items, a neighbor score for a particular user and a particular item in the neighbor-score matrix (S) determined by performing a dot product between preferences of the particular user and preferences of other users who have expressed preferences for the particular item in the binary matrix (R), or by performing a dot product between preferences for the particular item and preferences for other items that the particular user has expressed preferences for in the binary matrix (R);
applying, by the servers in the computer system, a factorization to approximate the neighbor-score matrix (S)

with a product of lower rank matrices and produce latent factors for the user and items;

calculating, by the servers in the computer system, scores for user-item pairs by computing a dot product between the latent factors for the user and the items;

sorting, by the servers in the computer system, the scores for the user-item pairs to generate the recommendation to the user;

providing, by the servers in the computer system, the recommendation to a general-purpose computer of the user;

approximating, by the servers in the computer system, a latent factor for a new-added user u by:

$$U_r(u,:) \approx S(u,:)V_r$$

where $S(u,:)$ is a neighbor-score vector for the new-added user u indicating neighbor scores for the new-added user u and the items, $V_r$ are the latent factors for the items, and $U_r(u,:)$ is the latent factor for the new-added user u; and updating the factorization when a number of the new-added users reaches a predetermined threshold.

12. The method of claim 11, further comprising:

computing, by the servers in the computer system, the dot product between the latent factors for the users and the items by:

$$S(u,v) \approx U_r(u,:)V_r(v,:)^T$$

where $S(u, v)$ is a predicted preference for the user (u) for an item (v).

13. The method of claim 11, further comprising:

partitioning, by the servers in the computer system, the users into blocks of size $N_b$ smaller than a number of the users and for each block iteratively calculating an $N_b \times M$ neighbor-score matrix and updating the factorization to include latent factors for the users in the block, wherein M indicates a number of the items.

14. The method of claim 11, further comprising:

reducing, by the servers in the computer system, space from O(N M) space where N indicates a number of the users and M indicates a number of the items to $O(N_b \rho)$ by storing only a subset of the scores the users with $N_b$ being the users in blocks of size $N_b$ smaller than the number of users N and $\rho$ being an integer less than M.

15. The method of claim 11, further comprising:

approximating, by the servers in the computer system, a latent factor for a new-added item v by:

$$V_r(v,:) \approx S(:,v)^T U_r$$

where $S(:,v)$ is a neighbor-score vector for the new-added item v indicating neighbor scores for the users and the new-added item v, $U_r$ are the latent vectors for the users, and $V_r(v,:)$ is the latent factor for the new-added item v; and updating the factorization when a number of the new-added items reaches a predetermined threshold.

* * * * *